Sept. 8, 1964  J. P. HELLER  3,148,139
METHOD FOR THE SEPARATION OF MATERIALS
Filed March 21, 1961

JOHN P. HELLER
INVENTOR.

BY Frederick E. Dumoulin

ATTORNEY.

United States Patent Office 3,148,139
Patented Sept. 8, 1964

3,148,139
METHOD FOR THE SEPARATION OF MATERIALS
John P. Heller, Dallas, Tex., assignor to Socony Mobil Oil Company, Inc., a corporation of New York
Filed Mar. 21, 1961, Ser. No. 97,243
7 Claims. (Cl. 210—21)

This invention relates to the separation of materials and relates more particularly to the separation of materials which have different diffusion constants.

Materials which have different diffusion constants can be separated from each other by introducing a body of the mixed materials into a body of liquid and permitting diffusion of the materials to occur. A material which has a greater diffusion constant will diffuse from the body of the mixed materials into the body of liquid at a greater rate than a material which has a lesser diffusion constant. Thus, prior to the time that diffusion of the materials throughout the body of liquid has attained equilibrium, a gradient in the ratio of the concentrations of the materials will exist within the body of liquid. At any distance, within the body of liquid, from the point at which the body of the mixed materials was introduced, the ratio of a material having a greater diffusion constant to a material having a lesser diffusion constant will be higher than at a lesser distance. A portion of the body of liquid may then be withdrawn from a point at a distance from the point of introduction of the body of the mixed materials. By this procedure, there will be obtained a sample of liquid containing a greater proportion of a material having a greater diffusion constant compared to a material having a lesser diffusion constant than in the original body of the mixed materials. The extent of separation of the materials thus effected will be dependent, among other factors, upon the difference in the diffusion constants of the materials and the distance, from the point of introduction of the body of the mixed materials, that the sample of liquid was withdrawn. A greater degree of separation can be effected by repetition of the procedure upon the separated materials. While this method of separation is effective, considering that other means of separation may not be feasible because of the physical or chemical characteristics of the materials, it requires an inordinately long period of time by reason of the fact that diffusion is slow. Further, the degree of separation is not as great as might be desired where the differences in the diffusion constants of the materials are small.

It is an object of this invention to separate materials from a mixture of the materials. It is another object of this invention to improve the procedure of separating materials based upon diffusion of the materials. It is another object of this invention to decrease the time required for separation of materials by diffusion. It is another object of this invention to improve the degree of separation of materials by diffusion. These and other objects of the invention will become apparent from the following detailed description.

In accordance with the invention, as a first step thereof, a body of the materials to be separated is introduced into a body of liquid. As a second step, a portion of the body of liquid containing at least a portion of the materials to be separated is subjected to a pattern of laminar flow. As a third step, the laminar flow is discontinued and the portion of the body of liquid subjected to the pattern of laminar flow in the second step is permitted to remain quiescent. Thereafter, as a fourth step, the portion of the body of liquid subjected to the pattern of laminar flow in the second step is again subjected to a pattern of laminar flow. This pattern is the same as in the second step but the direction of flow is the reverse of that in the second step. Thereafter, a portion of the body of liquid may be separated from the remainder thereof for recovery of separated material.

The procedure of the invention is based upon the fact that separation by diffusion is magnified by the phenomenon, discovered by me, of what may be termed "unmixing." Unmixing comprises the steps of (a) effecting a pattern of laminar flow in a body of liquid within a portion thereof containing a body of at least two materials having different diffusion constants and then (b) effecting the same pattern of laminar flow in the opposite direction. In the step (a), the body of the two materials having different diffusion constants becomes distributed, or mixed, within the body of liquid in a pattern substantially determined by the pattern of laminar flow. However, diffusion of the materials within the body of liquid occurs during the laminar flow. Thus, at the completion of the step (a), while the pattern of the body of the two materials is that substantially determined by the pattern of laminar flow, the lines of the pattern will have become diffused. In step (b), the two materials distributed within the body of liquid in the pattern determined by the pattern of the laminar flow become unmixed. Stated otherwise, the body of the two materials returns to substantially its original position within the body of liquid and to substantially its original shape. However, because because of diffusion of the two materials within the body of liquid during step (b), the body of the two materials, even though in substantially its original shape, will be diffused. This diffusion of the body of materials is greater than would have been attained within the same period of time in the absence of the two steps involved in unmixing. Further, the ratio of the amount of material having greater diffusion constant to the amount of material having a lesser diffusion constant will be greater at any point within the diffused body of the two materials than would have been attained in the same time in the absence of unmixing. Thus, the unmixing effects a greater degree of separation of the materials than could be otherwise attained by diffusion in the same length of time. For further information concerning the phenomenon of unmixing, reference is hereby made to the article appearing in American Journal of Physics, vol. 28, pp. 348–53 (April 1960).

The invention may be employed to separate any materials which are capable of diffusion in a liquid and which have different diffusion constants. For example, the procedure of the invention may be employed to separate liquids. The body of the liquids to be separated may consist of two liquids or may consist of more than two liquids. Further, for example, the procedure of the invention may also be employed to separate a liquid from a solid. In this case, the solid will be one which is retained in suspension in the liquid by virtue of its small size or other physical charcteristic. An example of this sort is a colloidal suspension. One or more solids may also be separated from one or more liquids.

The liquid into which the materials to be separated are introduced in the first step of the procedure may be any liquid compatible with the materials. Where the materials to be separated are liquids, a compatible liquid will be one in which each of the liquid materials is miscible. Where the materials to be separated are liquid and solid, a compatible liquid will be one in which the liquid is miscible and the solid will remain suspended. The liquid, further, must not react chemically with the materials to be separated.

Reference will hereby be made to the accompanying drawings in which.

Figure 1:
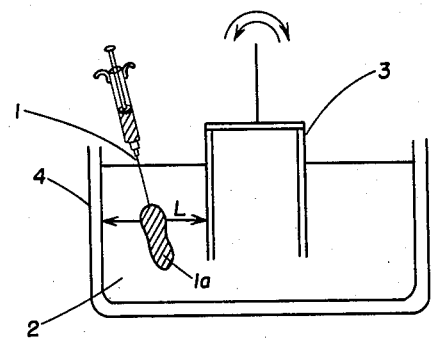
FIGURE 1 is a schematic diagram illustrating one method of carrying out the invention.

Referring to FIGURE 1, numeral 1 refers to a syringe, numeral 1a refers to a body of mixed materials, numeral 2 refers to a body of liquid, numeral 3 refers to a rotatable cylinder, and numeral 4 refers to a container for retaining the body of liquid. The body 1a of mixed materials is introduced into the body 2 of liquid by operation of the syringe 1. Introduction is effected slowly so as to avoid turbulent flow in order that the body of mixed material will retain substantially its integral character within the body of liquid except for diffusion that will begin to occur. After introduction of the body 1a of mixed materials, rotation of cylinder 3 is effected. Rotation of the cylinder may be either clockwise or counterclockwise in this second step of the procedure. For purposes of illustration, it will be assumed that rotation of the cylinder will be clockwise.

Rotation of the cylinder 3 effects flow of the liquid 2 and the body 1a of mixed materials in the direction of rotation of the cylinder. The cylinder 3 is rotated at a rate low enough that this flow of the liquid and the body of the mixed materials is laminar. The maximum rate of rotation of the cylinder at which stable laminar flow will be effected will depend upon the diameter of the cylinder, the physical characteristics of the liquid and the body of mixed materials, and the thickness and effective diameter of the annulus space between the cylinder 3 and the wall of container 4. Determination of the rate of rotation of the cylinder to effect stable laminar flow is readily made in accordance with the conventional principles of hydrodynamics. Reference is made to the article "Stability of a Viscous Liquid Contained between Two Rotating Cylinders," by Sir G. I. Taylor, in the Transactions of the Royal Society, Section A, vol. 223 (1923). In any case, a maximum rate of rotation to effect laminar flow may be determined experimentally.

The number of revolutions of the cylinder 3 may, within limits, be as desired. The number of revolutions should be sufficient to effect change in the shape of the body 1a of the mixed materials. On the other hand, the number of revolutions of the cylinder should not be so great that diffusion will prevent the substantial unmixing of the less diffusive component. Satisfactory results can generally be obtained where the cylinder is rotated between five and 50 times.

With rotation of the cylinder at a rate to effect laminar flow, the liquid 2 and the body 1a of the mixed materials are subjected to a pattern determined by the laminar flow within the annulus between the cylinder 3 and the wall of the container 4. With the system illustrated, the pattern will be substantially a spiral. The liquid and the body of mixed materials move, in laminar flow, within the container in the direction of rotation of the cylinder. As a result, the body of the mixed materials becomes elongated. Thus, the body of mixed materials will form a spiral whose center would be at the axis of the cylinder 3.

Figure 2:
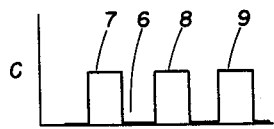
FIGURE 2 is a graph illustrating distribution of a diffusible material at one stage during the procedure of the invention.

With the body of mixed materials formed in a spiral pattern within the liquid 10, the concentration of the body of mixed materials in a vertical plane in the liquid 2 will be substantially as indicated in FIGURE 2. FIGURE 2 is a graph of the concentration of the body of mixed materials along the line L of FIGURE 1 within the liquid between the cylinder 3 and the wall of the container 4. As indicated in FIGURE 2, the concentration of the body of materials at the face of the cylinder and at the wall of the container is at a minimum. Assuming that the spiral contains three turns, the concentration of the materials between the turns of the spiral will also be at a minimum, as indicated by the numeral 6. Within the three turns, however, the concentration of the materials will be at a maximum as indicated by the numerals 7, 8, and 9.

Figure 3:
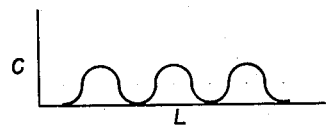
FIGURE 3 is a graph illustrating distribution of a diffusible material at another stage during the procedure of the invention.

In the third step of the procedure, laminar flow is discontinued and the liquid 2 and the body of the materials are permitted to remain quiescent. The period during which the liquid 2 and the body of the materials are permitted to remain quiescent may be as short as two seconds or as long as fifteen minutes or more. Diffusion of the mixed materials occurs and with diffusion the lines of the pattern of the body of materials decrease in sharpness. At this stage, the concentration of the mixed materials within the liquid will be substantially as indicated in FIGURE 3. FIGURE 3 is also a graph of the concentration of the body of mixed materials along the line L of FIGURE 1 within the liquid between the cylinder 3 and the wall of the container 4. At the cylinder and at the wall of the container, the concentration of the two materials is at a minium. Three peaks of maximum concentration remain but the concentration at the sides of the peaks decreases gradually rather than abruptly. At this stage, further, the material having the greater diffusion constant will have moved away from the point of maximum concentration to a greater extent than the material having the lesser diffusion constant.

In the last step of the procedure, the cylinder is again rotated. However, the cylinder is rotated this time in the opposite direction to that of the second step. Thus, the cylinder is rotated counterclockwise. Further, so that the pattern of the laminar flow in this step will be the same as in the second step, the cylinder is rotated at the same rate and for the same number of revolutions as in the second step. With counterclockwise rotation of the cylinder, laminar flow of the liquid and the spirally patterned body of mixed materials will be effected in the direction of rotation of the cylinder. As a result, the spiral pattern of the body of mixed materials becomes unwound and the body of the mixed materials assumes substantially its original shape, and position, as upon introduction within the liquid. The dimensions of the body of mixed materials, however, because of diffusion, will have become greater in the direction of the rotations. Further, the material having the greater diffusion constant will be elongated in a greater proportionate amount around the circumference of the cylinder, compared with the material having the lesser diffusion constant. At the very edges of this elongated pattern, the amount of the material having the lesser diffusion constant will be zero or substantially zero.

For recovery of the separated material, a portion of the body of liquid containing the body of materials is withdrawn. Withdrawal may be effected by means of syringe 1. The point at which withdrawal is made will depend upon the relative proportions of the mixed materials desired. At the very edges of the body, the withdrawn liquid will contain liquid 2 and the material having the greater diffusion constant. Where withdrawal is effected further inwardly of the body of materials, the withdrawn liquid will contain liquid 2, the material having the greater diffusion constant, and the material containing the lesser diffusion constant. Where withdrawal is made still further inwardly, the withdrawn liquid will contain a lesser proportion of the material having the greater diffusion constant compared to the material having the lesser diffusion constant.

Figure 4:
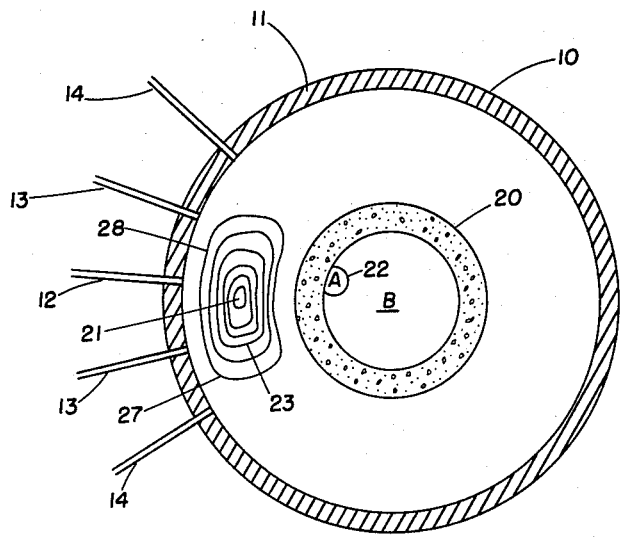
FIGURE 4 is a view, in section, of a form of apparatus for carrying out the procedure of the invention.

Reference will now be made to FIGURE 4. Numeral 10 refers to a wall of a cylindrical container 11, numerals 12, 13, and 14 refer to conduits for withdrawing liquid from the container 11, numeral 20 refers to a rotatable porous cylinder, and numeral 22 refers to a pipe. The pipe 22 is affixed to the cylinder 20 and is open to the cylinder 20 along its side in contact with the cylinder 20.

In operation, the space between the cylinder 20 and the wall 10 of the container 11 is filled with the liquid into which are introduced the mixed materials to be separated are then introduced under pressure into the opening A of the pipe 22. Simultaneously, liquid for diffusion of the materials to be separated is introduced under pressure into the portion B of the cylinder 20. The mixed materials to be separated pass from the pipe 22 through the porous cylinder 20 along the portion of the pipe at the side thereof open to the cylinder. The liquid introduced into the inner portion B of the cylinder 20 also passes through the porous cylinder. The pressures employed for introducing the body of materials to be separated and the liquid are both such that laminar flow in a radial direction into the liquid between the cylinder 20 and the wall 10 of the container 11 is effected. As a result, a body of the mixed materials to be separated enters into the body of liquid between the cylinder 20 and the wall 10 of the container 11.

Introduction of mixed materials through pipe 22 and introduction of liquid into the portion B of the cylinder are discontinued with formation of a body of the mixed materials in the body of liquid between the cylinder 20 and the wall 10 of the container 11. The cylinder 20 is then rotated through a desired number of revolutions to effect the pattern of laminar flow. The cylinder, after rotation through the desired number of revolutions, is stopped and the liquid and the materials are permitted to remain quiescent. Thereafter, the cylinder is rotated in the opposite direction the same number of revolutions. Following these steps, the body of material to be separated will be as indicated by the numeral 23. At point 21, the material having the lesser diffusion constant will be relatively concentrated. At the points indicated by the numerals 27 and 28, the material having the greater diffusion constant will be relatively concentrated. Another batch of materials to be separated is introduced into pipe 22 and another batch of liquid is introduced into the portion B of the cylinder 20. With introduction of the other batch of materials to be separated and the other batch of liquid, the liquid between the cylinder 20 and the wall 10 of the container 11 will be displaced toward the conduits 12, 13, and 14. The body 23 of materials for separation will also be displaced toward these conduits.

The portions of liquid which enter the various outlet conduits such as 12, 13, and 14 will differ in their content of the materials to be separated. Since the material having the greater diffusion constant will be at the points 27 and 28 of the body 23, the liquid passing through the conduits 13 will be relatively concentrated with respect to the material having the greater diffusion constant. The portion 21 of the body of material which passes through the conduit 12 will be relatively concentrated with respect to the material having the lesser diffusion constant. Through conduits 14, a liquid dilute with respect to the material having the greater diffusion constant and substantially free of the material having the lesser diffusion constant will be obtained.

The following example will be further illustrative of the invention. In this example, a mixture of a liquid red dye, i.e., neutral red, and a blue dye consisting of substantially solid particles of micron size of a ferrocyanide suspended in glycerol was separated. The mixture contained substantially equal amounts of the two dyes. The liquid mixture of the two dyes was injected slowly into a body of glycerol within a cylindrical container provided with a rotatable cylinder. After introduction of the mixture of the dyes, the cylinder was rotated in a clockwise direction through ten revolutions. Rotation was then stopped and the glycerol and dyes were allowed to remain quiescent for one minute. Thereafter, the cylinder was rotated in a counterclockwise direction for ten revolutions. Using a syringe, a sample of the liquid within the container was taken from the edge of the body of mixed dyes. The concentration of the red dye in the sample of the liquid thus withdrawn was appreciable, but the concentration of the blue colloidal particles was substantially zero. The time from the introduction of the mixed dyes to withdrawal of the sample of liquid from the container was no more than two minutes.

Having thus described my invention, it will be understood that such description has been given by way of illustration and example and not by way of limitation, reference for the latter purpose being had to the appended claims.

I claim:

1. In a process for the separation of at least two materials in admixture with each other and having different diffusion constants the steps comprising introducing a body of said materials into a body of liquid, subjecting said body of liquid containing said body of said materials to a first pattern of laminar flow, thereafter permitting said body of liquid containing said body of said materials to remain quiescent to permit diffusion of said materials within said liquid, thereafter subjecting said body of liquid containing said body of said materials to a second pattern of laminar flow, said second pattern of laminar flow being the same as said first pattern of laminar flow but being in a direction opposite to that of said first pattern of laminar flow whereby said two materials become separated from each other within said body of liquid, and recovering from said body of liquid one of said two materials thus separated from said other of said two materials.

2. The process of claim 1 wherein said two materials are liquids.

3. The process of claim 1 wherein said two materials are a liquid and a solid.

4. In a process for the separation of at least two materials in admixture with each other and having different diffusion constants the steps comprising introducing a body of said materials into a body of liquid, subjecting said body of liquid containing said body of said materials to a first pattern of laminar flow, thereafter permitting said body of liquid containing said body of said materials to remain quiescent for a period of at least two seconds to permit diffusion of said materials within said liquid, and thereafter subjecting said body of liquid containing said body of materials to a second pattern of laminar flow, said second pattern of laminar flow being the same as said first pattern of laminar flow but being in a direction opposite to that of said first pattern of laminar flow whereby said two materials become separated from each other within said body of liquid, and recovering from said body of liquid one of said two materials thus separated from said other of said two materials.

5. In a process for the separation of at least two materials in admixture with each other and having different diffusion constants the steps comprising introducing a body of said materials into a body of liquid, subjecting said body of liquid containing said body of said materials to a pattern of laminar flow by effecting rotational movement in a first direction of a portion of said body of liquid containing said body of said materials, thereafter discontinuing said rotational movement of said body of liquid containing said body of said materials and permitting said body of liquid containing said body of said materials to remain quiescent to permit diffusion of said materials within said liquid, thereafter subjecting said body of liquid containing said body of said materials to said pattern of laminar flow by effecting rotational movement of a portion of said body of liquid containing said body of said materials in a second direction, said second direction being the opposite of said first direction whereby said two materials become separated from each other within said body of liquid, and recovering from said body of liquid one of said two materials thus separated from said other of said two materials.

6. The process of claim 5 wherein said rotational movement involves between five and fifty revolutions of said portion of said body of liquid containing said body of said material.

7. In a process for the separation of at least two materials in admixture with each other and having different diffusion constants the steps comprising introducing a body of said materials into a body of liquid, stirring said body of liquid containing said body of said materials so as to effect laminar flow within said body of liquid and draw said body of said materials into a spiral pattern, discontinuing said stirring and permitting said body of liquid containing said body of said materials to remain quiescent to permit diffusion of said materials in said liquid, thereafter stirring said body of liquid containing said body of said materials in a direction opposite to that of said first-named stirring to unwind said spiral pattern of said body of said materials whereby said two materials become separated from each other within said body of liquid, and recovering from said body of liquid one of said two materials thus separated from said other of said two materials.

No references cited.

UNITED STATES PATENT OFFICE
CERTIFICATE OF CORRECTION

Patent No. 3,148,139 September 8, 1964

John P. Heller

It is hereby certified that error appears in the above numbered patent requiring correction and that the said Letters Patent should read as corrected below.

Column 2, line 26, strike out "because"; line 54, for "charcteristic" read -- characteristic --; column 5, line 2, after "separated" insert -- . The mixed materials to be separated --; column 6, line 41, strike out "and".

Signed and sealed this 12th day of January 1965.

(SEAL)
Attest:

ERNEST W. SWIDER
Attesting Officer

EDWARD J. BRENNER
Commissioner of Patents